US012670362B2

(12) United States Patent
Chai et al.

(10) Patent No.: US 12,670,362 B2
(45) Date of Patent: Jun. 30, 2026

(54) VIDEO SYNTHESIS WITHIN A MESSAGING SYSTEM

(71) Applicant: Snap Inc., Santa Monica, CA (US)

(72) Inventors: Menglei Chai, Los Angeles, CA (US); Kyle Olszewski, Los Angeles, CA (US); Jian Ren, Marina Del Ray, CA (US); Yu Tian, Piscataway, NJ (US); Sergey Tulyakov, Marina del Rey, CA (US)

(73) Assignee: Snap Inc,., Santa Monica, CA (US)

( * ) Notice: Subject to any disclaimer, the term of this patent is extended or adjusted under 35 U.S.C. 154(b) by 1108 days.

(21) Appl. No.: 17/491,226

(22) Filed: Sep. 30, 2021

(65) Prior Publication Data

US 2022/0101104 A1     Mar. 31, 2022

Related U.S. Application Data

(60) Provisional application No. 63/198,151, filed on Sep. 30, 2020.

(51) Int. Cl.
    *G06N 3/045*     (2023.01)
    *G06F 18/214*     (2023.01)
    (Continued)

(52) U.S. Cl.
    CPC ........... *G06N 3/045* (2023.01); *G06F 18/214* (2023.01); *G06N 3/08* (2013.01); *G06T 7/20* (2013.01);
    (Continued)

(58) Field of Classification Search
    CPC .. G06N 3/045; G06N 3/02–0499; G06N 3/08; G06F 18/214; G06T 7/20;
    (Continued)

(56) References Cited

U.S. PATENT DOCUMENTS 10,546,230 B2 * 1/2020 Kurata ..................... G06N 5/04
11,188,790 B1 * 11/2021 Kumar ................. G06V 10/774
    (Continued)

FOREIGN PATENT DOCUMENTS

CN      108460812        8/2018
CN      102682420 A  *  9/2019
    (Continued)

OTHER PUBLICATIONS

Sun, Ximeng, Huijuan Xu, and Kate Saenko. "Twostreamvan: Improving motion modeling in video generation." Proceedings of the IEEE/CVF Winter Conference on Applications of Computer Vision. 2020. (Year: 2020).*

(Continued)

*Primary Examiner* — Jeremy L Stanley
(74) *Attorney, Agent, or Firm* — Schwegman Lundberg & Woessner, P.A.

(57)     ABSTRACT

Aspects of the present disclosure involve a system comprising a computer-readable storage medium storing a program and method for video synthesis. The program and method provide for accessing a primary generative adversarial network (GAN) comprising a pre-trained image generator, a motion generator comprising a plurality of neural networks, and a video discriminator; generating an updated GAN based on the primary GAN, by performing operations comprising identifying input data of the updated GAN, the input data comprising an initial latent code and a motion domain dataset, training the motion generator based on the input data, and adjusting weights of the plurality of neural networks of the primary GAN based on an output of the video discriminator; and generating a synthesized video based on the primary GAN and the input data.

20 Claims, 8 Drawing Sheets

(51) Int. Cl.
　　G06N 3/08　　　(2023.01)
　　G06T 7/20　　　(2017.01)
(52) U.S. Cl.
　　CPC ............... *G06T 2207/10016* (2013.01); *G06T*
　　　　　*2207/20081* (2013.01); *G06T 2207/20084*
　　　　　　　　　　　　　　　　　　(2013.01)
(58) Field of Classification Search
　　CPC . G06T 2207/10016; G06T 2207/20081; G06T
　　　　　　　　　　　　　　　　　2207/20084
　　See application file for complete search history.

(56) References Cited

U.S. PATENT DOCUMENTS

2018/0314716 A1　11/2018　Kim et al.
2020/0204822 A1*　6/2020　Liu ......................... G06T 13/40

FOREIGN PATENT DOCUMENTS

| | | | | |
|---|---|---|---|---|
| CN | 110210386 | | 9/2019 | |
| CN | 110568442 | | 12/2019 | |
| CN | 111325817 | | 6/2020 | |
| CN | 116261745 | A | 6/2023 | |
| KR | 102084782 | B1 * | 3/2020 | ............. G06T 13/40 |
| WO | WO-2022072725 | A1 | 4/2022 | |

OTHER PUBLICATIONS

Kang Tae Won, KR-102084782-B1 (English Translation), Mar. 4, 2020 (Year: 2020).*
Abdullah Hamdi and Bernard Ghanem. IAN: Combining Generative Adversarial Networks for Imaginative Face Generation. Arxiv. org. arXiv: 1904.07916. (Apr. 16, 2019).*

Dongxu Wei, Xiaowei Xu, Haibin Shen, and Kejie Huang. GAC-GAN: A General Method for Appearance-Controllable Human Video Motion Transfer. Archiv.org. arXiv:1911.10672. (Feb. 9, 2020).*
"International Application Serial No. PCT/US2021/053012, International Search Report mailed Jan. 21, 2022", 4 pgs.
"International Application Serial No. PCT/US2021/053012, Written Opinion mailed Jan. 21, 2022", 7 pgs.
Clark, Aidan, "Adversarial Video Generation on Complex Datasets", arXiv:1907.06571v2, arxiv.org, Cornell University Library, 201Olin Library Cornell University Ithaca, NY 14853, (2019), 21 pgs.
Karras, Tero, "Training Generative Adversarial Networks with Limited Data", arxiv.org, Cornell University Library, 201 Olin Library Cornell University Ithaca, NY 14853, (Jun. 11, 2020), 32 pgs.
Tulyakov, Sergey, "MoCoGAN: Decomposing Motion and Content for Video Generation", arxiv.org, Cornell University Library, 201 Olin Library Cornell University Ithaca, Ny 14853, (Jul. 17, 2017), 11 pgs.
"Chinese Application Serial No. 202180066923.5, Office Action mailed Jun. 25, 2025", w/ English Translation, 21 pgs.
"International Application Serial No. PCT/US2021/053012, International Preliminary Report on Patentability mailed Apr. 13, 2023", 9 pgs.
"Chinese Application Serial No. 202180066923.5, Response filed Oct. 20, 2025 to Office Action mailed Jun. 25, 2025", W/ English Claims, 17 pgs.
"Korean Application Serial No. 10-2023-7014448, Notice of Preliminary Rejection mailed Jan. 20, 2026", w/ English translation, 12 pgs.
Cao, Yangjie, "Review of computer vision based on generative adversarial networks", Journal of Image and Graphics, vol. 23, No. 10, (Nov. 7, 2018), 1433-1449.
Tulyakov, Sergey, "MoCoGAN: Decomposing Motion and Content for Video Generation", CVPR, (Dec. 14, 2017), 13 pgs.

* cited by examiner $t = 16$ $t = 14$ $t = 12$ $t = 10$ $t = 8$ $t = 6$ $t = 4$ $t = 2$ $t = 16$ $t = 14$ $t = 12$ $t = 10$ $t = 8$ $t = 6$ $t = 4$ $t = 2$ $t = 16$ $t = 14$ $t = 12$ $t = 10$ $t = 8$ $t = 6$ $t = 4$ $t = 2$

VIDEO SYNTHESIS WITHIN A MESSAGING SYSTEM

CROSS-REFERENCE TO RELATED APPLICATION

This application claims the benefit of priority to U.S. Provisional Application No. 63/198,151, filed on Sep. 30, 2020, which is incorporated herein by reference in its entirety.

TECHNICAL FIELD

The present disclosure relates generally to image and video processing, including video synthesis within a messaging system.

BACKGROUND

Image and video synthesis are related areas aiming to generate content from noise. Areas of focus include image synthesis methods leading to image-based models capable of achieving improved resolutions and renderings, and wider variations in image content.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
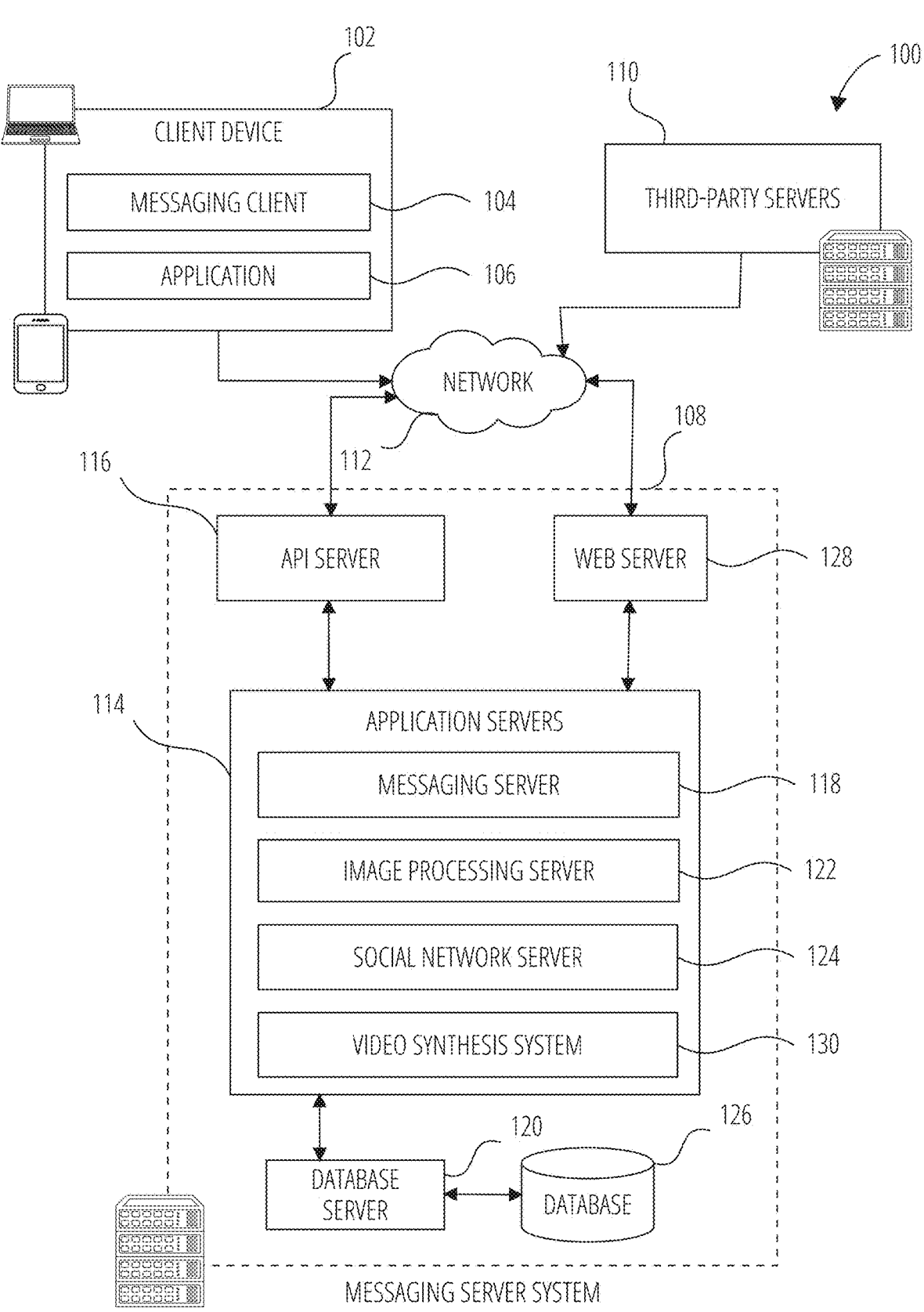
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Image and video synthesis are related areas aiming at generating content from noise. Advancements have focused on improving image synthesis methods leading to image-based models capable of achieving large resolutions, high-quality renderings, and wide variations in image content. Image synthesis models may be capable of rendering images often indistinguishable (or virtually indistinguishable) from real ones.

However, developments in the area of video synthesis may achieve comparably modest improvements. The statistical complexity of videos and larger model sizes means current video synthesis methods produce relatively low-resolution videos while requiring longer training times and more computational resources. This is particularly relevant on low-resource computers, such as a mobile devices with limited memory and processing power. For example, using a contemporary image generator to generate videos with a target resolution of 256×256 pixels may require a substantial computational budget resulting in monetary training costs in the tens of thousands of dollars. In addition, there are hardware requirements needed for such a task.

There are two main, but not necessarily exclusive, desirable properties for synthesized videos: (i) high quality (e.g., resolution) for each individual frame, and (ii) temporal consistency throughout the frame sequence (e.g., depicting the same subject matter or content with plausible motion). Prior efforts attempt to achieve both goals with a single framework, making such methods computationally demanding when high resolution is desired.

Therefore, a novel video synthesis technique may be desired in order to render high-resolution, visually consistent videos with low training times and less computational resources.

As discussed, some video rendering techniques are computationally complex and possibly not well-suited for implementation on low-resource computers, such as a mobile device with limited memory and processing power. A video synthesis technique disclosed herein is directed to a multipart framework, leveraging current image synthesis methods with a novel motion generator to render high-resolution temporally-consistent videos with high training efficiency and thus, significantly less computational resources than current video synthesis techniques. Techniques disclosed herein may be used, for example, in a messaging system. A messaging system typically allow users to exchange content items (e.g., messages, images and/or video) with one another in a message thread.

An example video synthesis technique uses a generative adversarial network ("GAN") including a video generator and a video discriminator. In one or more embodiments, the video generator creates "fake videos" (e.g., synthesized videos) using a combination of a pre-trained image generator and a motion generator. The pre-trained image generator is trained prior to training the GAN using a training set of real videos. The motion generator is trained during the training mode of the GAN. The GAN is first trained by feeding the pre-trained image generator and the motion generator an initial latent code selected from a distribution (e.g., a normal distribution). The motion generator also takes in a motion trajectory vector that will influence (e.g., randomize) the motion codes generated by the motion generator. The output of the motion generator are processed and fed to the pre-trained image generator, which in turn outputs a vector of all the frames in the sequence (e.g., a synthesized video). The synthesized video vector is then fed to the video discriminator to assess the synthesized video vector against a training data set and provide feedback to the generator to adjust the neural network variables. The video discriminator constrains the generated motion patterns to be similar to those of the training videos. In an example, the process is run until the discriminator cannot distinguish between a synthesized video and a real video from the dataset—that is, it determines that a synthesized video is real.

In an example, a video synthesis technique includes an image discriminator to force the frame content to be temporally consistent. In an example, the motion generator is implemented via two recurrent neural networks, that operate on the initial content code to obtain the motion representation. This approach models motion as a residual between continuous latent codes that are passed to the image generator for individual frame generation. Such a residual representation can also facilitate the disentangling of motion and content. In another example, the motion generator is trained using the chosen image discriminator with contrastive loss to force the content to be temporally consistent, and a patch-based multi-scale video discriminator for learning motion patterns.

The disclosed embodiments feature several major advantages over conventional video synthesis pipelines. First, these embodiments allow for the generation of high-quality videos at high resolutions (e.g., 1024×1024). Second, in searching for a latent trajectory in an image generator, the disclosed embodiments provides for being computationally more efficient, requiring an order of magnitude less training time than previous video-based works. Third, as the image generator is updated or otherwise improved, it can be trained on a separate high-quality image dataset. Due to the disentangled representation of motion and content, the subject system provides for learning motion from a video dataset and applying it to an image dataset, even in the case of two datasets belonging to different domains. The subject system provides utilizes an image generator to synthesize high quality videos when a domain (e.g., dogs) contains many high-quality images but no corresponding high-quality videos. In this manner, it is possible to generate realistic videos of objects that were not seen moving during training (e.g., generating realistic pet face videos using motions extracted from images of talking people). Such new video generation task is referred to as cross-domain video synthesis herein.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, a social network server 124, and a video synthesis system 130. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The social network server 124 supports various social networking functions and services and makes these functions and services available to the messaging server 118. To this end, the social network server 124 maintains and accesses an entity graph within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a Loeb-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

In an example, the video synthesis system 130 generates an image or a sequence of images (e.g., video) using a generative adversarial network. In another example, the video synthesis system 130 generates the image or a sequence of images (e.g., video) through the a video synthesis technique. In some examples, the video synthesis system 130 receives conditional data as input which controls parameters of the generated images or sequence of images. Portions of the video synthesis system 130 may exist on the messaging client 104 and other portions of the video synthesis system 130 may exist on the application servers 114. In some examples, an image or video generator neural network resides on the messaging client 104 and an image or video discriminator neural network resides on the application servers 114.

Generative Adversarial Network Architecture

Figure 2:
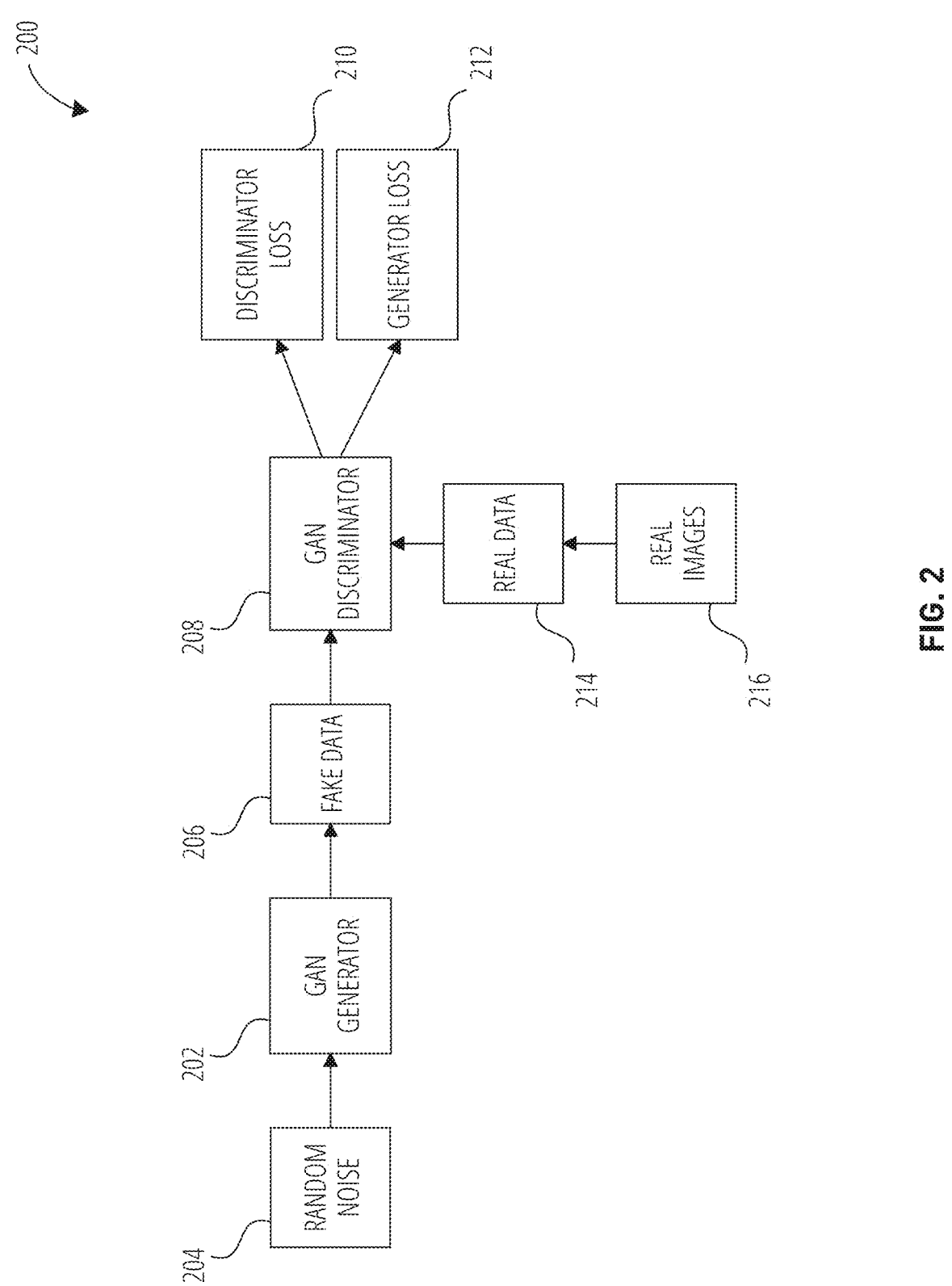
FIG. 2 is an illustration of a generative adversarial network architecture, according to some examples.

FIG. 2 is an illustration of a representative generative adversarial network architecture 200, according to some examples. In some examples, the video synthesis system 130 comprises of a GAN. As noted above, a generative adversarial network is a machine learning framework in which two neural networks, a discriminator network and a generator network, contest with each other (e.g., in a zero-sum arrangement). Given a training dataset, a GAN trained model learns to generate new data with the same characteristics as the training set (e.g., style, resolution). That is, GANs are types of generative models that generate realistic synthetic data, with the same qualities as those of the underlying training data. For example, given a set of images of real human faces, a GAN will, with the appropriate training, generate a brand new artificial (e.g., fake) human face.

Generally, generator networks attempt to create fake data that resembles real data (e.g., fake videos that look like real videos). In an example, a generator network takes in a random vector as input and outputs realistic images or image sequences e.g., video). On the other hand, the discriminator network attempts to correctly determine whether a given image or video is generated by the generator (e.g., fake or artificial) or from the dataset (e.g., real).

The generative adversarial network architecture 200 comprises a GAN generator 202 and GAN discriminator 208. The GAN generator 202 and the GAN discriminator 208 are neural networks. The GAN generator 202 and GAN discriminator 208 can each be can be any type of artificial neural network (e.g., long short-term memory neural network, a convolutional neural network). The output of the GAN generator 202 is fake data 206 (e.g., artificial) that is linked directly as input of the GAN discriminator 208. Using backpropagation, the GAN discriminator 208 classification provides information that the GAN generator 202 uses to update its weights.

The GAN discriminator 208 is a classifier that tries to distinguish real data 214 (e.g., from real images, real videos) from artificial data or fake data 206 (e.g., created by the GAN generator 202). The GAN discriminator 208 is trained using two data sources: real data 214 and fake data 206. For example, real data 214 may comprise real human faces and the fake data 206 may comprise synthesized or artificial human faces (e.g., faces entirely generated by a computer). The fake data 206 is data that is generated by the GAN generator 202. During training, the GAN discriminator 208 classifies the real data 214 and the fake data 206. The discriminator loss 210 accommodates for the GAN discriminator 208 misclassifying real data 214 as fake and fake data 206 as real. The GAN discriminator 208 updates its weights (e.g., weights of the neural network layers) through backpropagation using the discriminator loss 210.

The GAN generator 202 is a neural network that generates fake data 206 based on feedback from the GAN discriminator 208. It learns to make the GAN discriminator 208 classify the fake data 206 as real. The GAN generator 202 takes random noise 204 as input and transforms the random noise 204 into meaningful output data. The generator loss 212 accommodates for the GAN generator 202 producing fake data 206 that the GAN discriminator 208 classifies as fake. The GAN generator 202 updates its weights through backpropagation through the GAN discriminator 208 and the GAN generator 202. using the generator loss 212.

Video Synthesis

Figure 3:
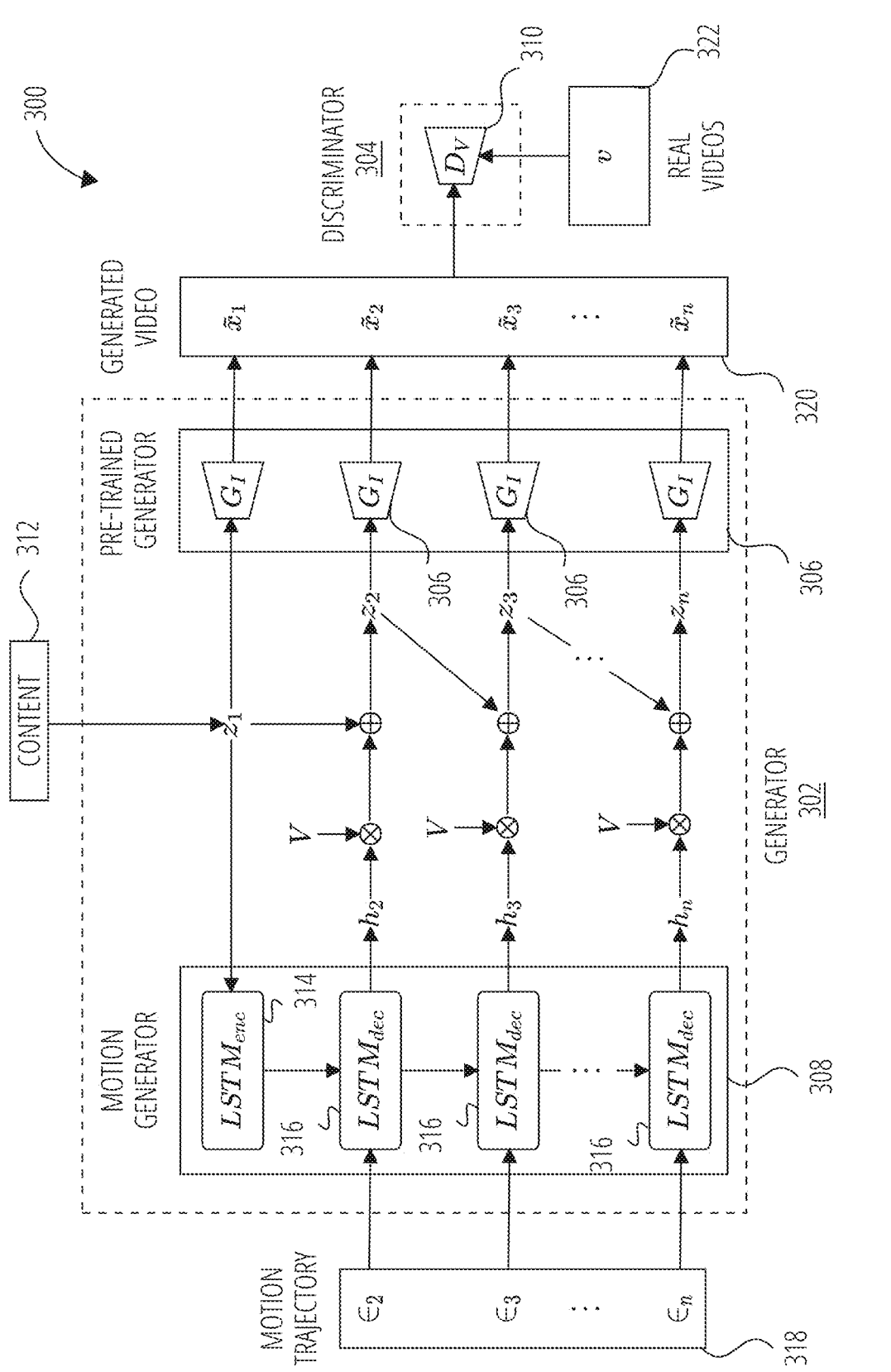
FIG. 3 shows a flow diagram of a video synthesis technique for generating videos using a pre-trained image generator and a motion generator, according to some examples.

FIG. 3 shows a flow diagram of an example video synthesis process 300 for generating videos using a generative adversarial network ("GAN"). The video synthesis process 300 comprises a generator 302, which includes a pre-trained image generator 306 ("$G_I$") and a motion generator 308 ("$G_M$"), and a discriminator 304 including a video discriminator 310 ("$D_V$").

The generator 302 uses an initial input latent code 312 ("$z_1$") and a motion trajectory vector 318 to synthesize each individual frame. The generated video sequence or generated video 320 ("$\tilde{v}$") is given by $\tilde{v} = \{\tilde{x}_1, \tilde{x}_2, \ldots, \tilde{x}_n\}$. For each synthesized frame, $\tilde{x}_t$, $\tilde{x}_t = G_I(z_t)$ for $t = 1, 2, \ldots, n$. On the other hand, the real video sequence or real video 322 ("v") is defined as $v = \{x_1, x_2, \ldots, x_n\}$ and the training distribution as $p_v$. In an example, the real video 322 is a training dataset used for training the generator 302 and the discriminator 304. The generated videos 320 and the real videos 322 are fed to the video discriminator 310.

The pre-trained image generator 306 receives information from the motion generator 308 to generate high-quality image frames and increase the training efficiency of the method with manageable computational resources. In an example, each of the pre-trained image generator 306 and the motion generator 308 takes an initial input latent code 312. In an example, the pre-trained image generator 306 is pre-trained, for instance, prior to training the rest of the generator 302. The pre-trained image generator may be pre-trained with a primary dataset while the generator 302 is trained on a secondary dataset. In an example, the pre-trained image generator 306 is trained on a dataset of real images. In still another example, the pre-trained image generator 306 is trained on a content dataset. In an example, when the pre-trained image generator 306 is pre-trained, the process of training generator 302 is, in effect, the process of training the motion generator 308 with a motion dataset. In some other examples, the pre-trained image generator 306 is not pre-trained and is trained with a training dataset within the video synthesis process 300.

In an example, the pre-trained image generator 306 may follow an image generator architecture based on one or more of: training generative adversarial networks with limited data; analyzing and improving the image quality of stylegan; differentiable augmentation for data-efficient GAN training; and/or image augmentations for GAN training. In another example, where the pre-trained image generator 306 is fixed during training of the generator, video motion is disentangled from image content, enabling video synthesis even when the image content and the video motion come from different domains.

The motion generator 308 takes in an initial input latent code 312 ("$z_1$") to predict consecutive latent codes. In an example, $z_1 \in Z$, and $Z = \{z_1, z_2, \ldots, z_n\}$ where n is the number of frames in the generated video 320. A z vector, as used herein, is a vector containing random values from a Gaussian (normal) distribution or some other distribution. In an example, input code $z_1$ is sampled from the normal distribution $p_z$. In another example, using StyleGAN2, $z_1$ is sampled from $p_z$, where $p_z$ is the distribution after the multi-layer perceptron ("MLP"), as the latent codes within this distribution can be semantically disentangled better than when using the normal distribution.

As an example, the motion generator 308 is implemented with two long short-term memory ("LSTM") neural networks—LSTM encoder 314 ("$LSTM_{enc}$") and LSTM decoder 316 ("$LSTM_{dec}$"). As will be noted, the motion generator 308 and the pre-trained image generator 306 may be implemented with other types of neural network architectures. The latent code $z_1$ is fed to the LSTM encoder 314 which encodes $z_1$ to obtain the initial hidden state $h_1$. The output of the LSTM encoder 314 is then passed to the LSTM decoder 316 which estimates n−1 continuous states recursively. LSTM encoder 314 and LSTM decoder 316 can be modeled by the following equations ("Equation 1"):

$$h_1, c_1 = LSTM_{enc}(z_1)$$

$$h_t, c_t = LSTM_{dec}(\varepsilon_t, (h_{t-1}, c_{t-1})), t = 2, 3, \dots, n$$

where h and c denote the hidden state and cell state respectively, and motion trajectory vector 318 ("$\varepsilon_t$") is a noise vector sampled from the normal distribution to model motion diversity at timestamp t.

It is noted that conventional methods will use $h_t$ as the motion code for the specific frame to be generated while the content code is fixed for all frames. However, such a design requires a recurrent network to estimate the motion while preserving consistent content from the latent vector, which is difficult to learn in practice. Traditional GANs can incur difficulties in extracting and controlling discrete features within the same image due to feature entanglement. A GAN may not be as capable of distinguishing finer discrete details in an image like a human can, thus leading to features becoming "entangled" with each other. Entanglement limits the ability of the GAN to produce images without entangled features (e.g., combinations of hair color and eye color, or hair style and skin color).

Thus, the techniques described herein are directed to motion disentanglement and using a sequence of motion residuals for estimating the motion trajectory. Specifically, the motion residual is modeled as the linear combination of a set of interpretable directions in the latent space. In an example, to create a motion trajectory vector, first, principal component analysis ("PCA") is conducted on m randomly sampled latent vectors from Z to get basis V. Then, the motion direction is estimated from the previous frame $z_{t-1}$ to the current frame $z_t$ by using $h_t$ and V as described by the following equation ("Equation 2"):

$$z_t = z_{t-1} + \lambda \cdot h_t \cdot V, t = 2, 3, \dots, n$$

where the hidden state $h_t \in [-1, 1]$, and $\lambda$ controls the controls the step given by the residual. Combining Eqn. 1 and Eqn. 2, we have $G_M(z_1)=\{z_1, z_2, \dots, z_n\}$ and the generated video 320 ("$\tilde{v}$") given as $\tilde{v}=G_I(G_m(z_1))$.

Returning briefly to the motion trajectory vector 318 (e.g., noise vector $\varepsilon_t$). As will be noted motion trajectory vector 318 allows for the control of the diversity of motion. In some examples, without further manipulation, the LSTM decoder 316 may neglect the $\varepsilon_t$, resulting in motion mode collapse. That is, the motion generator 308 ($G_M$) may not capture the diverse motion patterns from training videos and generate distinct videos from one initial latent code with similar motion patterns for different sequences of noise vectors. However, techniques described herein address these issues by including a mutual information loss ("$L_m$") to maximize the mutual information between the hidden vector $h_t$ and the noise vector $\varepsilon_t$. With sim(u, v)=$u^T v/\|u\| \|v\|$ denoting the cosine similarity between vectors u and v. Thus, $L_m$ is defined by Equation 3:

$$L_m = \frac{1}{n-1} \sum_{t=2}^{n} sim(H(h_t), \varepsilon_t)$$

where H is a 2-layer MLP that serves as a mapping function.

During training, the motion generator 308 modifies the network parameters with information received from the video discriminator 310 ("$D_V$"). In an example, the video discriminator 310 is a multi-scale video discriminator configured to determine whether the video sequence or generated video 320 is real or synthesized. In an example, the video discriminator 310 is based on the architecture of PatchGAN. However, in an example, techniques described use 3D convolutional layers in the video discriminator 310, as they can model temporal dynamics better than 2D convolutional layers. The video discriminator 310 divides the input video sequence into small 3D patches, and classifies each patch as real or fake. The local responses for the input sequence are averaged to produce the final output. Additionally, each frame in the input video sequence is conditioned on the first frame, as it falls into the distribution of the pre-trained image generator 306, for more stable training. To optimize the adversarial loss to learn $G_M$ and $D_V$ we apply the following equation ("Equation 4"):

$$L_{D_V} = \mathbb{E}_{v \sim p_v}[\log(D_V(v))] + \mathbb{E}_{z_1 \sim p_z}[\log(1 - D_V(G_I(G_M(z_1))))]$$

Figure 4:
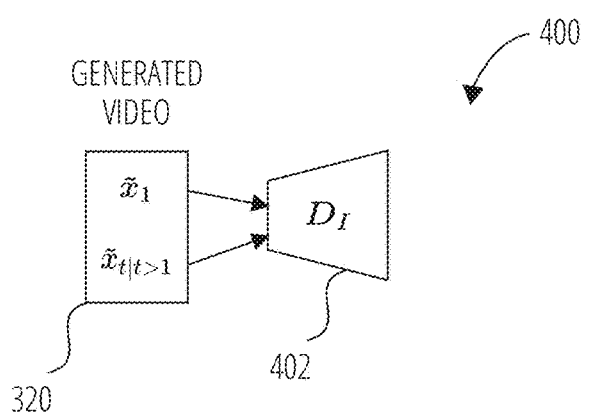
FIG. 4 shows a flow diagram of an image discrimination technique, according to some examples.

FIG. 4 shows a flow diagram of an image discrimination process 400, according to some examples. In an example, the image discrimination process 400 is used during the video synthesis process 300 as part of the training process of the motion generator 308. In another example, the image discrimination process 400 is used as part of training the motion generator 308 and the pre-trained image generator 306. The image discrimination process 400 includes a contrastive image discriminator 402 that takes in frames of the generated video 320 as input (e.g., $\tilde{x}_1$ and $\tilde{x}_{t|t>1}$) and produces a new frame or sequence of frames that are coherent with the input frames in at least one of motion and quality. It will be noted that in the examples where the pre-trained image generator 306 is pre-trained, the image generator may be trained on a dataset (e.g., a video dataset) of a first domain (e.g., images of animal faces) while learning (e.g., being trained on) motion generator parameters using a dataset of a second domain (e.g., images of human facial expressions).

In some examples, Eqn. 4 alone may not provide the ability to explicitly constrain the generated images $\tilde{x}_{t|t>1}$ to possess similar quality and content as the first image $\tilde{x}_1$, which is sampled from the image space of the image generator 302 and thus has high fidelity. The image discrimination process 400 leverages a contrastive image discriminator 402 ("$D_I$") to match both quality and content between $\tilde{x}_1$ and $\tilde{x}_{t|t>1}$.

The contrastive image discriminator 402 achieves increased perceptual quality by training $D^I$ and $G_M$ adversarially. The contrastive image discriminator 402 takes in $\tilde{x}_t$ and uses $\tilde{x}_1$ the real sample and $\tilde{x}_{t|t>1}$ as the fake sample. The loss function is described by the following equation ("Equation 5"):

$$L_{D_I} = \mathbb{E}_{z_1 \sim p_z}[\log(D_I(G_I(z_1)))] + \mathbb{E}_{z_1 \sim p_z, z_t \sim G_M(z_1)|t>1}[\log(1 - D_I(G_I(z_t)))]$$

To achieve content similarity between frames within a video, the contrastive image discriminator 402 is leveraged as a feature extractor. In an example, the contrastive image discriminator 402 is trained with a form of contrastive loss known as InfoNCE, which is based on representation learning with contrastive predictive coding. It will be noted that a goal of this approach is that pairs of images with the same content should be close together in embedding space, while images containing different content should be far apart.

Figure 5:
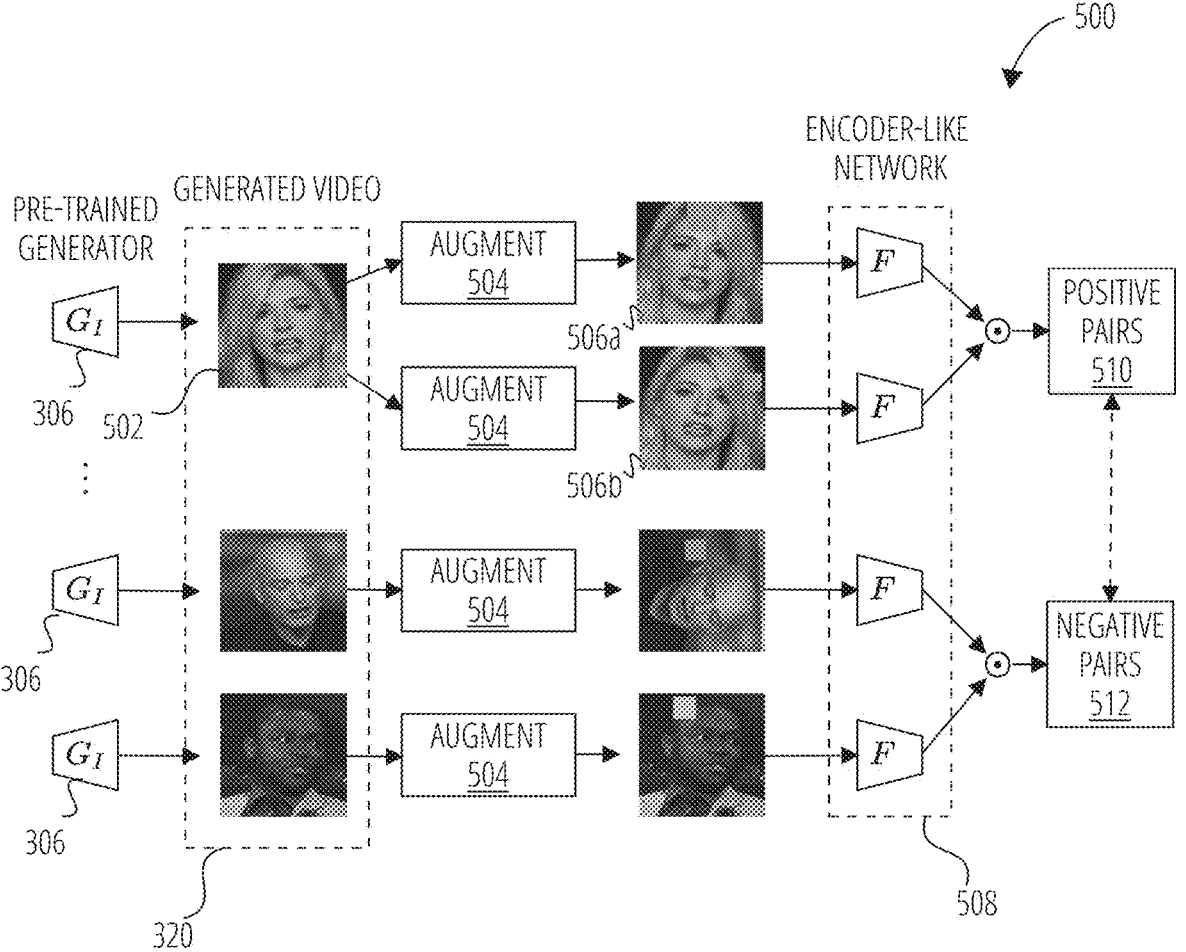
FIG. 5 shows a flow diagram of a feature extractor including a contrastive image discriminator, according to some examples.

Turning now to FIG. 5, a flow diagram of a feature extractor 500 including a contrastive image discriminator (similar to the contrastive image discriminator 402), according to some examples, is shown. In an example, given a minibatch of N generated videos 320, $\{\tilde{v}^{(1)}, \tilde{v}^{(2)}, \ldots, \tilde{v}^{(N)}\}$, a frame 502 ("t") is randomly sampled from each video:

$$\{\tilde{x}_t^{(1)}, \tilde{x}_t^{(2)}, \ldots, \tilde{x}_t^{(N)}\}.$$

Then using an augment 504 two augmented versions $$\{\tilde{x}_t^{(ia)}, \tilde{x}_t^{(ib)}\}$$

(506a and 506b) are created for each frame $$\tilde{x}_t^{(i)}$$

resulting in 2N samples where $$\{\tilde{x}_t^{(ia)}, \tilde{x}_t^{(ib)}\}$$

are positive pairs 510, as they share the same content, and $$\{\tilde{x}_t^{(ia)}, \tilde{x}_t^{(ja)}\}$$

are all negative pairs 512 for i≠j.

in an example, the feature extractor 500 includes an encoder-like 508 ("F"). The encoder-like 508 shares the same weights and architecture as the contrastive image discriminator 402. In another example, the encoder-like 508 shares the same weights and architecture as the contrastive image discriminator 402 but excludes layers from the contrastive image discriminator 402. In yet another example, the encoder-like 508 includes a 2-layer MLP as a projection head that produces the representation of the input images. A contrastive loss function $L_{contr}$, representing the cross-entropy computed across 2N augmentation is described by the following equation ("Equation 6"):

$$L_{contr} = -\sum_{i=1}^{N}\sum_{a=a}^{b}\log\left(\frac{\exp\left(sim\left(F\left(\tilde{x}_t^{(ia)}\right), F\left(\tilde{x}_t^{(ib)}\right)\right)/\tau\right)}{\sum_{j=1}^{N}\sum_{\beta=a}^{b}\mathbb{1}_{[j\neq i]}\left(\exp\left(sim\left(F\left(\tilde{x}_t^{(ia)}\right), F\left(\tilde{x}_t^{(i\beta)}\right)\right)/\tau\right)\right)}\right)$$

where sim(.,.) is the cosine similarity function defined in Eq. 3, $\mathbb{1}_{[j\neq i]}\in\{0, 1\}$ is equal to 1 if j≠i, and $\tau$ is a temperature parameter. In an example, $\tau$ is determined empirically and it is set to 0.07.

In an example, the feature extractor 500 can include a momentum decoder mechanism to maintain a memory bank to delete the oldest negative pair 512 and update the new negative pair 512. In some examples, augment 504 includes translation, color jittering, and cutout are used on the synthesized images. For instance, on augmented frame 506a and 506b the image is augmented using a cutout. With the positive and negative pairs generated on-the-fly during training, the discriminator can effectively focus on the content of the input samples.

In yet another example, the choice of positive pairs 510 in Eqn. 6 is specifically designed for cross-domain video synthesis, as videos of arbitrary content from the image domain may not be available. In the case that images and videos are from the same domain, the positive and negative pairs are easier to obtain. Further, one can randomly select and augment two frames from a real video to create positive pairs sharing the same content, while the negative pairs contain augmented images from different real videos.

In another example, the feature extractor 500 can also include a feature matching loss $L_f$, aside from the contrastive loss function $L_{contr}$. The feature matching loss $L_f$ is applied to the generated first frame and other frames by changing the $L^1$ regularization to cosine similarity.

In view of the foregoing, overall loss function for training the motion generator 308, the video discriminator 310, and the contrastive image discriminator 402 is defined by the following equation ("Equation 7"):

$$\min_{G_M}\left(\max_{D_V}L_{D_V} + \max_{D_I}L_{D_I}\right) + \max_{G_M}(\lambda_m L_m + \lambda_f L_f) + \min_{D_I}(\lambda_{contr}L_{contr})$$

where $\lambda_m$, $\lambda_{contr}$, and $\lambda_f$ are hyperparameters to balance losses.

Figure 6:
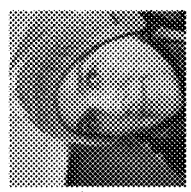
FIG. 6 illustrates an example output sequence of cross-domain video generation, according to some examples.
Figure 6:
Figure 6:
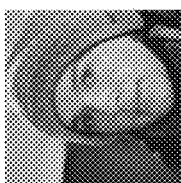
Figure 6:
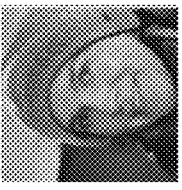
Figure 6:
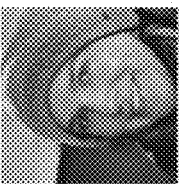
Figure 6:
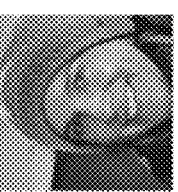
Figure 6:
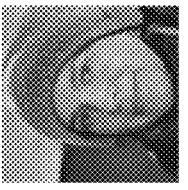
Figure 6:

FIG. 6 shows example output sequences illustrating cross-domain video generation, according to examples described herein. In FIG. 6, a sequence of frames of a smiling woman is synthesized by the video synthesis process 300 using a pair of disconnected training datasets (e.g., the FFHQ dataset and the VoxCeleb dataset). As noted above with respect to FIG. 3, the video synthesis process 300 is capable of disentangling motion from image content and transferring the motion patterns from one domain to another. In this example, the video synthesis process 300 learns human facial motion from VoxCeleb and then synthesizes videos using the image content from FFHQ thereby generating high-quality temporally-consistent videos (e.g., 1024×1024 pixels). The synthesized frames shown in FIG. 6 (t={2, 4, 6, 8, 10, 12, 14, 16}) illustrate coherent motion trajectory.

Figure 7A:
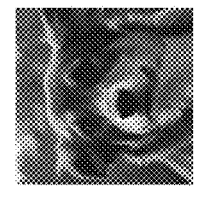
FIG. 7A and FIG. 7B illustrate another set of example output sequences of video synthesis, according to examples described herein.
Figure 7A:
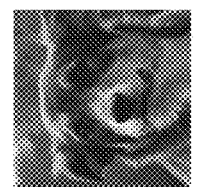
Figure 7A:
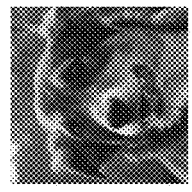
Figure 7A:
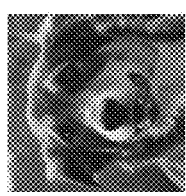
Figure 7A:
Figure 7A:
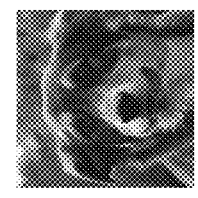
Figure 7A:
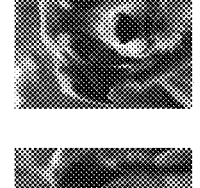
Figure 7B:
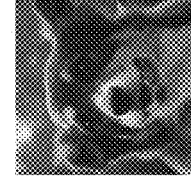
Figure 7B:
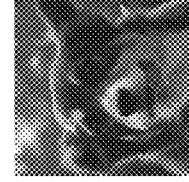
Figure 7B:
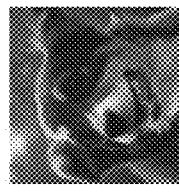
Figure 7B:
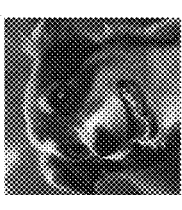
Figure 7B:
Figure 7B:
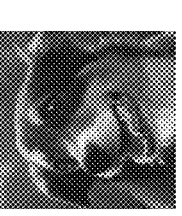
Figure 7B:
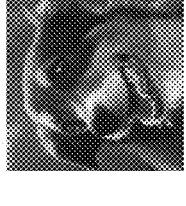
Figure 7B:
Figure 7B:
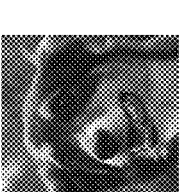

FIG. 7A and FIG. 7B illustrate another set of example output sequences of video synthesis, according to examples described herein. Similar to the output sequence in FIG. 6, a sequence of frames of a dog are synthesized using the video synthesis process 300 and disconnected datasets (e.g., AFHQ-Dog for image content and VoxCeleb for motion content). Each initial frame t=2 is the same for FIG. 7A and FIG. 7B. However, each frame thereafter t={4, 6, 8, 10, 12, 14, 16}) for each sequence is different from the corresponding frame in the other sequence.

Machine Architecture

Figure 8:
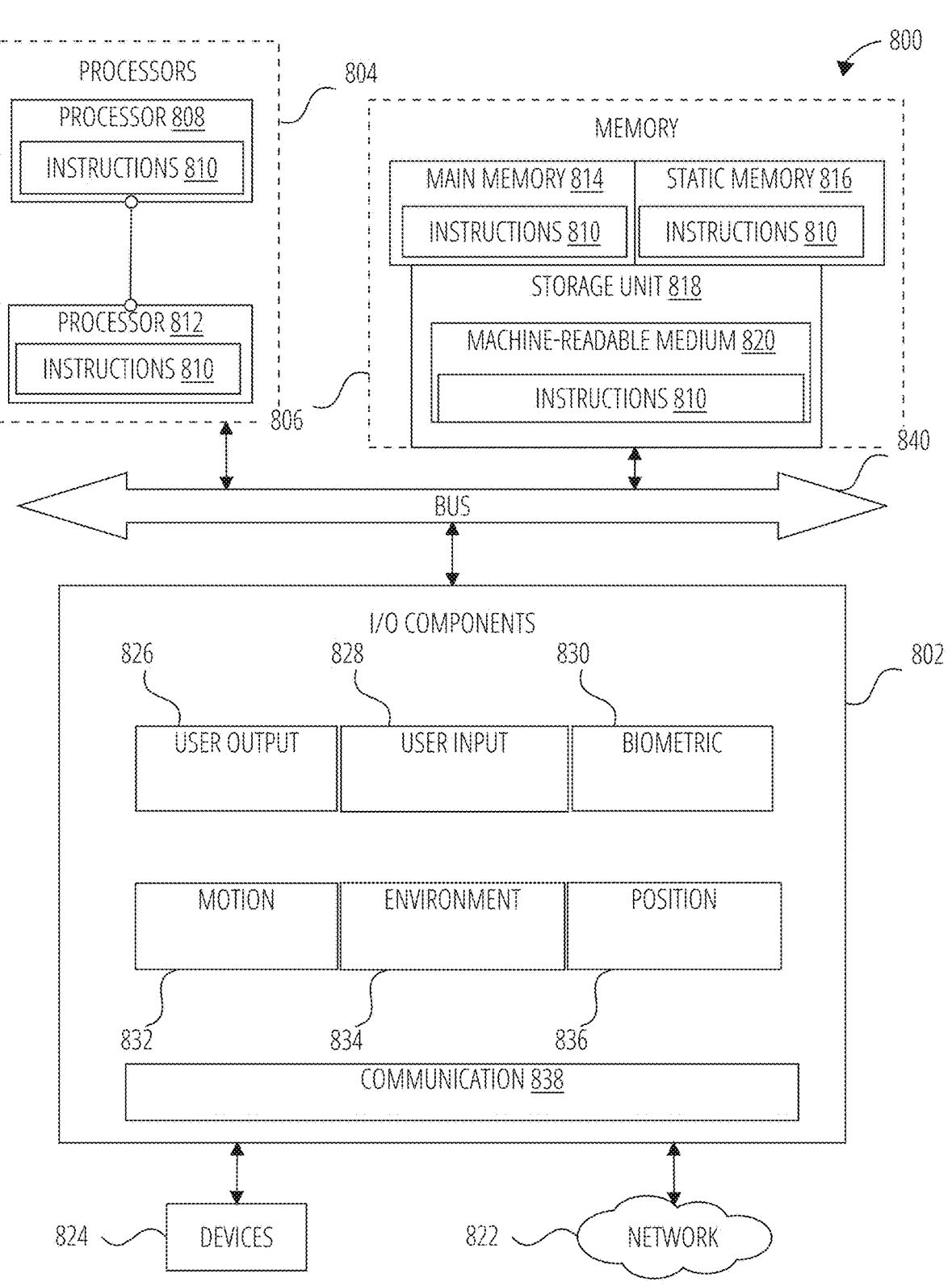
FIG. 8 is a diagrammatic representation of a machine in the form of a computer system within which a set of instructions may be executed for causing the machine to perform any one or more of the methodologies discussed herein, in accordance with some examples.

FIG. 8 is a diagrammatic representation of the machine 800 within which instructions 810 (e.g., software, a program, an application, an applet, an app, or other executable code) for causing the machine 800 to perform any one or more of the methodologies and techniques discussed herein may be executed. For example, the instructions 810 may cause the machine 800 to execute any one or more of the methods described herein. The instructions 810 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein. The machine 800, for example, may comprise the client device 102. or any one of a number of server devices forming part of the messaging server system 108. In some examples, the machine 800 may also comprise both client and server systems, with certain operations of a particular method or algorithm being performed on the server-side and with certain operations of the particular method or algorithm being performed on the client-side.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single-core, a single processor with multiple cores (e.g., a multi-core processor), multiple processors with a single core, multiple processors with multiples cores, or any combination thereof.

The memory 806 includes a main memory 814, a static memory 816, and a storage unit 818, both accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the Processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 834, or position components 836, among a wide array of other components. For example, the biometric components 830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 832 include acceleration sensor components (e.g., accelerometer), gravitation sensor components, rotation sensor components (e.g., gyroscope).

The environmental components 834 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface Component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

Figure 9:
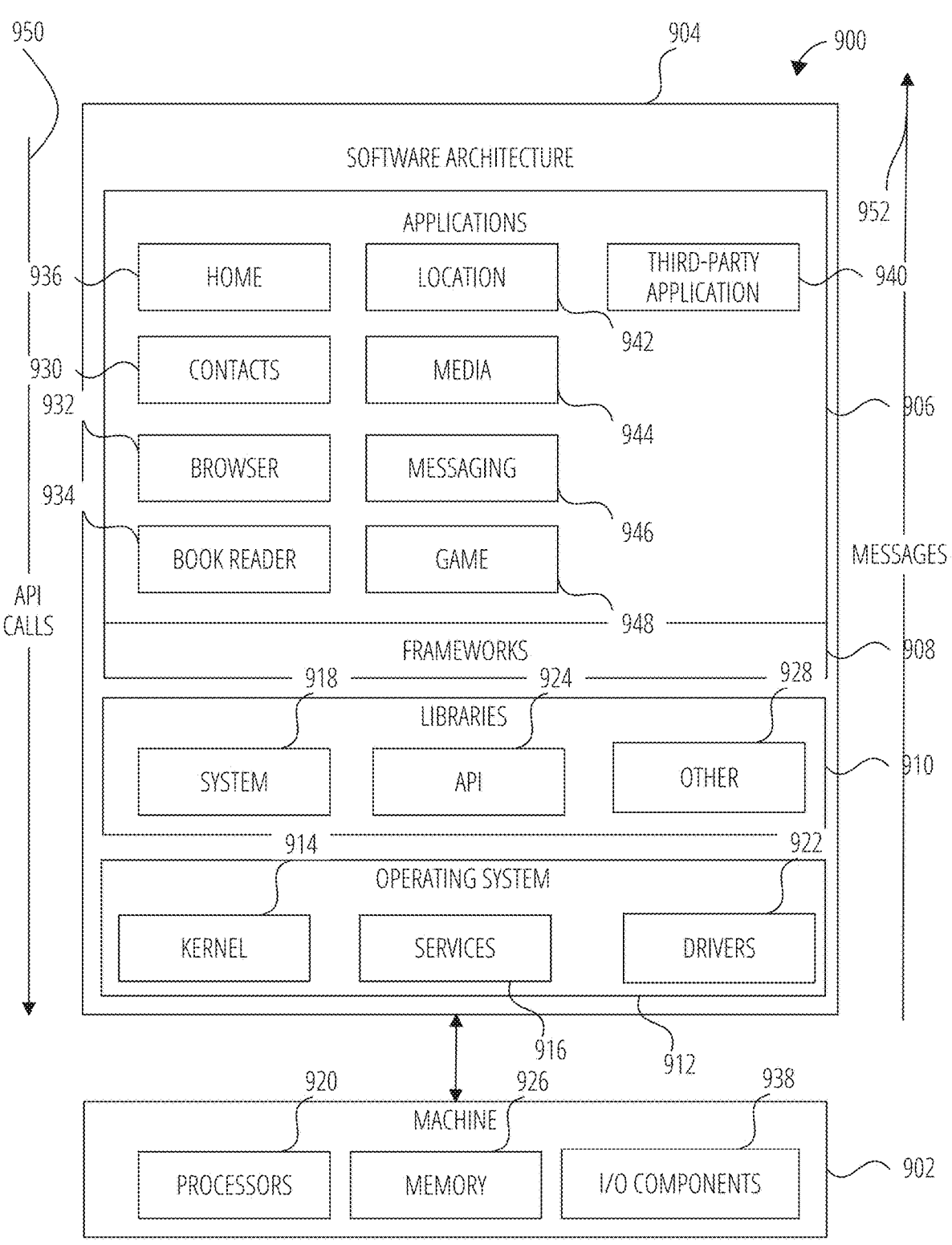
FIG. 9 is a block diagram showing a software architecture within which examples may be implemented.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A video synthesis method comprising:
accessing a primary generative adversarial network (GAN) comprising a pre-trained image generator, a motion generator comprising a plurality of neural networks, and a video discriminator;
generating an updated GAN based on the primary GAN, by performing operations comprising
identifying input data of the updated GAN, the input data comprising an initial latent code and a motion domain dataset, and
training the motion generator based on the input data using a contrastive image discriminator with contrastive loss to constrain generated images to possess similar quality and content, the contrastive loss comprising positive pairs of augmented frames from a same video that share same content and negative pairs of augmented images from different videos; and
generating a synthesized video based on the primary GAN and the input data,
wherein the pre-trained image generator is trained on a first dataset of a first domain while learning motion generator parameters using an second dataset of a second domain, the first domain and the second domain corresponding to different types of captured subjects, and the first dataset and the second dataset corresponding to different types of data.

2. The video synthesis method of claim 1, wherein generating the updated GAN based on the primary GAN further comprises:
adjusting weights of the plurality of neural networks of the primary GAN based on an output of the video discriminator.

3. The video synthesis method of claim 1, wherein the motion domain dataset corresponds to a motion trajectory vector that is used to synthesize each individual data frame corresponding to the generated synthesized video.

4. The video synthesis method of claim 1, wherein the pre-trained image generator is configured to receive the initial latent code and output from the motion generator, to generate the synthesized video.

5. The video synthesis method of claim 1, wherein the pre-trained image generator is pre-trained with a primary dataset comprising at least one of real images or a content dataset.

6. The video synthesis method of claim 5, wherein a generator corresponding to the motion generator and the pre-trained image generator is trained with a secondary dataset that is different than the primary dataset.

7. The video synthesis method of claim 1, wherein the motion generator is configured to receive the initial latent code to predict consecutive latent codes.

8. The video synthesis method of claim 1, wherein the motion generator is implemented with two long short-term memory neural networks.

9. The method of claim 1, wherein the motion generator learns motion patterns from the second domain to synthesize temporally consistent video frames in the first domain, thereby enabling generation of realistic videos of the first domain using motion extracted from the second domain.

10. The method of claim 9, wherein the first domain corresponds to captured subjects of animal faces,
    wherein the second domain corresponds to captured subjects of human facial expressions, and
    wherein that the pre-trained image generator is trained on the video dataset of the animal faces while learning motion generator parameters using the image dataset of the human facial expressions.

11. A system comprising:
    at least one processor; and
    a memory storing instructions that, when executed by the at least one processor, configure the system to perform operations comprising:
    accessing a primary generative adversarial network (GAN) comprising a pre-trained image generator, a motion generator comprising a plurality of neural networks, and a video discriminator;
    generating an updated GAN based on the primary GAN, by performing operations comprising
    identifying input data of the updated GAN, the input data comprising an initial latent code and a motion domain dataset, and
    training the motion generator based on the input data using a contrastive image discriminator with contrastive loss to constrain generated images to possess similar quality and content, the contrastive loss comprising positive pairs of augmented frames from a same video that share same content and negative pairs of augmented images from different videos; and
    generating a synthesized video based on the primary GAN and the input data,
    wherein the pre-trained image generator is trained on a first dataset of a first domain while learning motion generator parameters using an second dataset of a second domain, the first domain and the second domain corresponding to different types of captured subjects, and the first dataset and the second dataset corresponding to different types of data.

12. The system of claim 11, wherein generating the updated GAN based on the primary GAN further comprises:

adjust weights of the plurality of neural networks of the primary GAN based on an output of the video discriminator.

13. The system of claim 11, wherein the motion domain dataset corresponds to a motion trajectory vector that is used to synthesize each individual data frame corresponding to the generated synthesized video.

14. The system of claim 11, wherein the pre-trained image generator is configured to receive the initial latent code and output from the motion generator, to generate the synthesized video.

15. The system of claim 11, wherein the pre-trained image generator is pre-trained with a primary dataset comprising at least one of real images or a content dataset.

16. The system of claim 15, wherein a generator corresponding to the motion generator and the pre-trained image generator is trained with a secondary dataset that is different than the primary dataset.

17. The system of claim 11, wherein the motion generator is configured to receive the initial latent code to predict consecutive latent codes.

18. The system of claim 11, wherein the motion generator is implemented with two long short-term memory neural networks.

19. A non-transitory computer-readable storage medium, the computer-readable storage medium including instructions that when executed by a computer, cause the computer to perform operations comprising:
    accessing a primary generative adversarial network (GAN) comprising a pre-trained image generator, a motion generator comprising a plurality of neural networks, and a video discriminator;
    generating an updated GAN based on the primary GAN, by performing operations comprising
    identifying input data of the updated GAN, the input data comprising an initial latent code and a motion domain dataset, and
    training the motion generator based on the input data using a contrastive image discriminator with contrastive loss to constrain generated images to possess similar quality and content, the contrastive loss comprising positive pairs of augmented frames from a same video that share same content and negative pairs of augmented images from different videos; and
    generating a synthesized video based on the primary GAN and the input data,
    wherein the pre-trained image generator is trained on a first dataset of a first domain while learning motion generator parameters using an second dataset of a second domain, the first domain and the second domain corresponding to different types of captured subjects, and the first dataset and the second dataset corresponding to different types of data.

20. The computer-readable storage medium of claim 19, wherein generating the updated GAN based on the primary GAN further comprises:
    adjust weights of the plurality of neural networks of the primary GAN based on an output of the video discriminator.

* * * * *